(12) United States Patent
Escowitz et al.

(10) Patent No.: US 11,945,139 B2
(45) Date of Patent: Apr. 2, 2024

(54) METHOD FOR COMPOSITE TRUSS MANUFACTURING

(71) Applicant: Arris Composites Inc., Berkeley, CA (US)

(72) Inventors: Ethan Escowitz, Berkeley, CA (US); Erick Davidson, Piedmont, CA (US); J. Scott Perkins, Oakland, CA (US); Riley Reese, Oakland, CA (US)

(73) Assignee: Arris Composites Inc., Berkeley, CA (US)

( * ) Notice: Subject to any disclaimer, the term of this patent is extended or adjusted under 35 U.S.C. 154(b) by 53 days.

(21) Appl. No.: 17/403,271

(22) Filed: Aug. 16, 2021

(65) Prior Publication Data

US 2022/0048227 A1 Feb. 17, 2022

Related U.S. Application Data

(60) Provisional application No. 63/065,705, filed on Aug. 14, 2020.

(51) Int. Cl.
| | |
|---|---|
| *B29C 43/22* | (2006.01) |
| *B29C 43/00* | (2006.01) |
| *B29C 70/20* | (2006.01) |
| *B29C 70/34* | (2006.01) |
| *B29K 105/10* | (2006.01) |
| *B29K 105/14* | (2006.01) |
| *B29L 31/00* | (2006.01) |

(52) U.S. Cl.
CPC .......... *B29C 43/224* (2013.01); *B29C 43/003* (2013.01); *B29C 70/205* (2013.01); *B29C 70/34* (2013.01); *B29K 2105/101* (2013.01); *B29K 2105/14* (2013.01); *B29L 2031/001* (2013.01)

(58) Field of Classification Search
CPC ...... B29C 70/205; B29C 70/34; B29C 43/224
See application file for complete search history.

(56) References Cited

U.S. PATENT DOCUMENTS

| | | | | |
|---|---|---|---|---|
| 5,200,251 | A | * | 4/1993 | Brand ................ B29D 99/0014 52/630 |
| 9,126,365 | B1 | * | 9/2015 | Mark ...................... B29B 15/12 |
| 10,926,489 | B2 | | 2/2021 | Davidson et al. |
| 10,946,595 | B2 | | 3/2021 | Davidson et al. |

(Continued)

FOREIGN PATENT DOCUMENTS

DE 102018210119 A1 12/2019

OTHER PUBLICATIONS

Authorized Officer: Wellhausen, C, International Search Report and Written Opinion issued in PCT application No. PCT/US2021/046157, dated Jul. 11, 2022, 16 pp.

(Continued)

*Primary Examiner* — Andrew D Graham
(74) *Attorney, Agent, or Firm* — Kaplan Breyer Schwarz, LLP

(57) ABSTRACT

Methods for fabricating fiber-composite truss structures comprise a) individually molding multiple unit cells of a given size, and subsequently fusing them together in a repeating pattern, b) cross members are consolidated with longerons while maintaining continuity of fiber in the longerons, and c) compression-molded truss components are unioned to continuous fiber beams by means of mechanically interlocking joints.

6 Claims, 7 Drawing Sheets

(56) References Cited

U.S. PATENT DOCUMENTS

| | | | |
|---|---|---|---|
| 2006/0165955 A1* | 7/2006 | Ruegg | B60N 2/686 |
| | | | 428/113 |
| 2008/0087371 A1* | 4/2008 | Friedrich | E04H 12/02 |
| | | | 156/166 |
| 2010/0065192 A1* | 3/2010 | Wilson | G06F 3/042 |
| | | | 156/180 |
| 2010/0323181 A1* | 12/2010 | Nutt | B29D 99/0021 |
| | | | 428/221 |
| 2013/0108837 A1* | 5/2013 | Blot | B64C 1/12 |
| | | | 428/188 |
| 2013/0330510 A1* | 12/2013 | Gonda | B32B 3/28 |
| | | | 29/530 |
| 2015/0001214 A1* | 1/2015 | Jung | B29C 70/68 |
| | | | 156/175 |
| 2015/0298368 A1* | 10/2015 | Krahnert | B29C 43/021 |
| | | | 264/154 |
| 2016/0361869 A1* | 12/2016 | Mark | B33Y 50/02 |
| 2018/0126674 A1* | 5/2018 | Ohtani | B29C 43/18 |
| 2018/0272645 A1* | 9/2018 | Pavlov | B32B 3/06 |
| 2019/0299500 A1* | 10/2019 | Gurney | F01D 25/005 |
| 2020/0114596 A1 | 4/2020 | Davidson et al. | |
| 2020/0361122 A1 | 11/2020 | Pelman et al. | |
| 2021/0187879 A1 | 6/2021 | Escowitz et al. | |
| 2021/0229757 A1* | 7/2021 | Gralka | C08J 5/24 |
| 2021/0316501 A1* | 10/2021 | Boyce | B33Y 80/00 |

OTHER PUBLICATIONS

Authorized Officer: Kurzbauer, Katja, Invitation to Pay Additional Fees, and Communication Related to the Results of the Partial International Search with Provisional Opinion issued in PCT application No. PCT/US2021/046157, dated May 19, 2022, 9 pp.

* cited by examiner

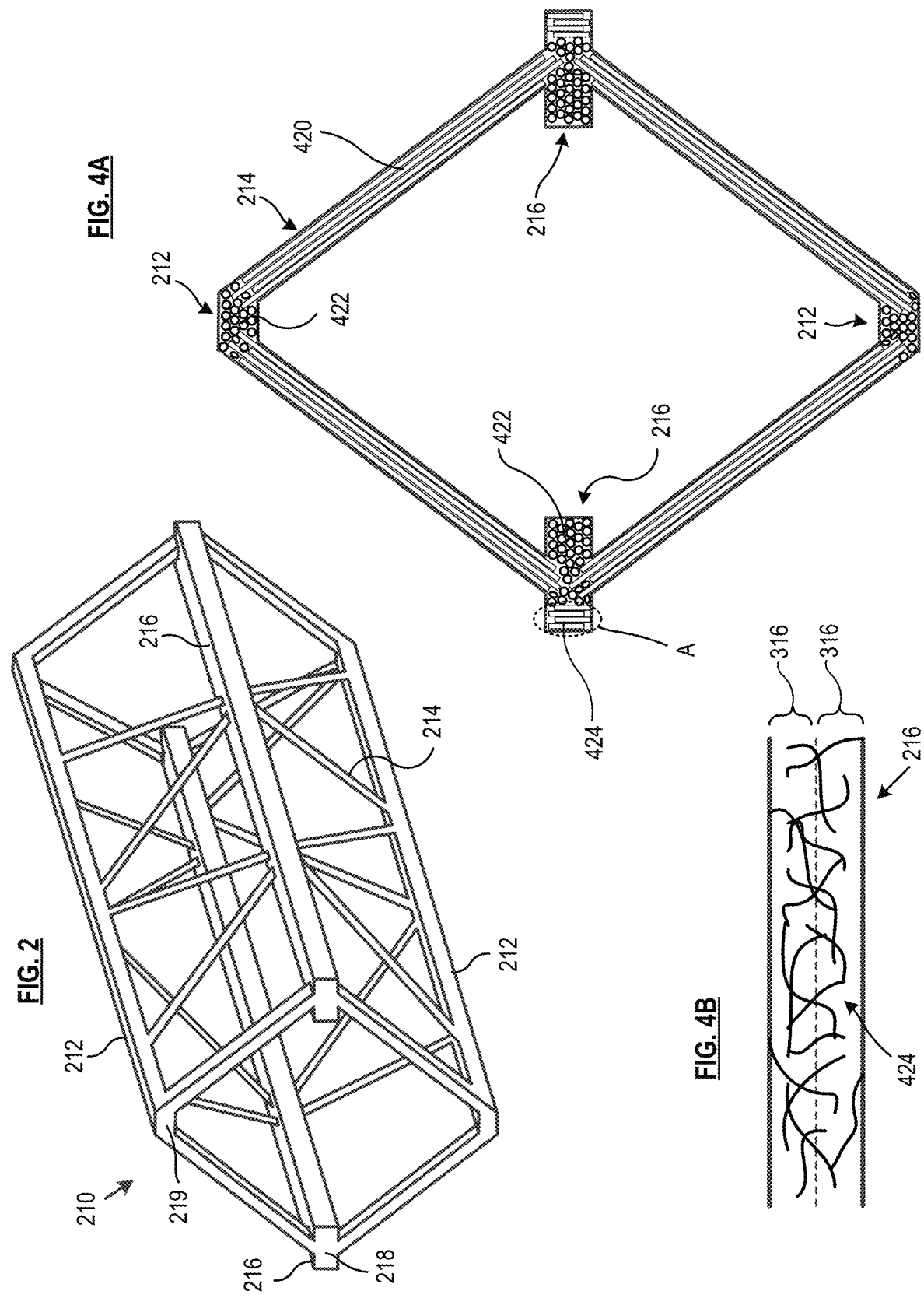

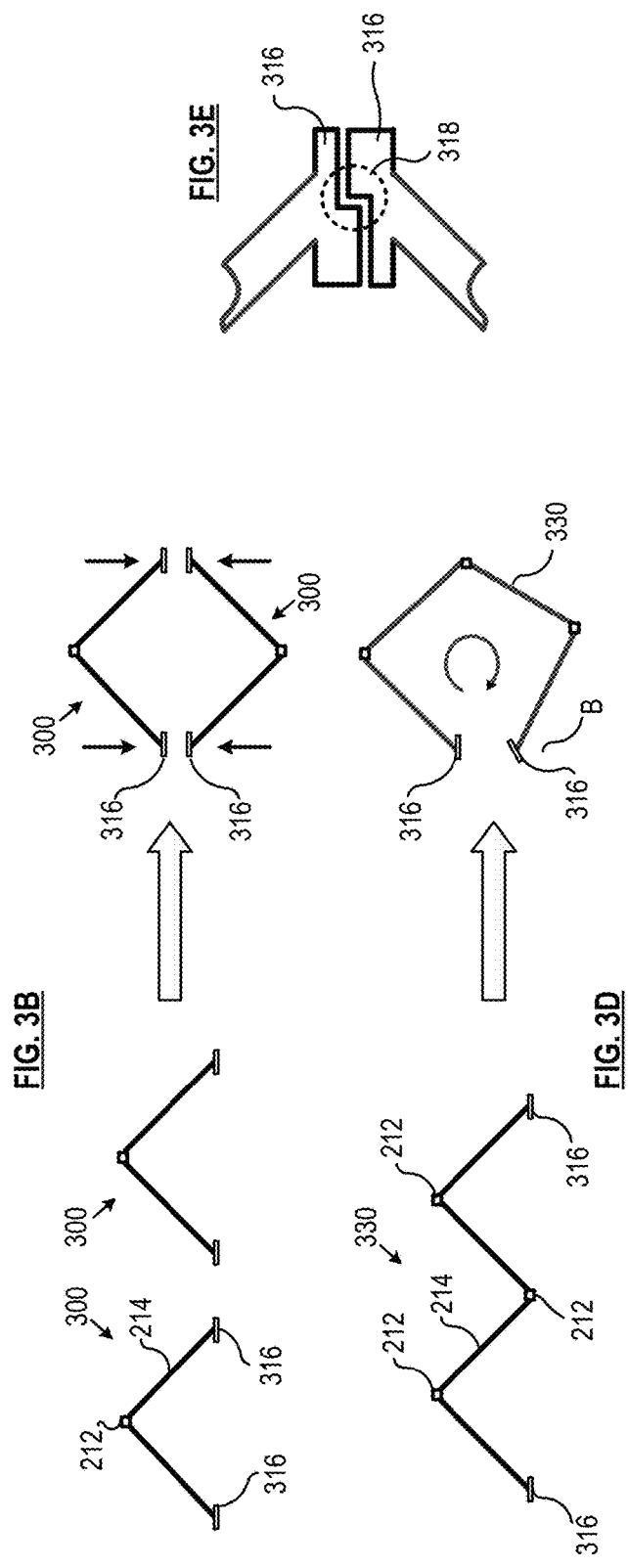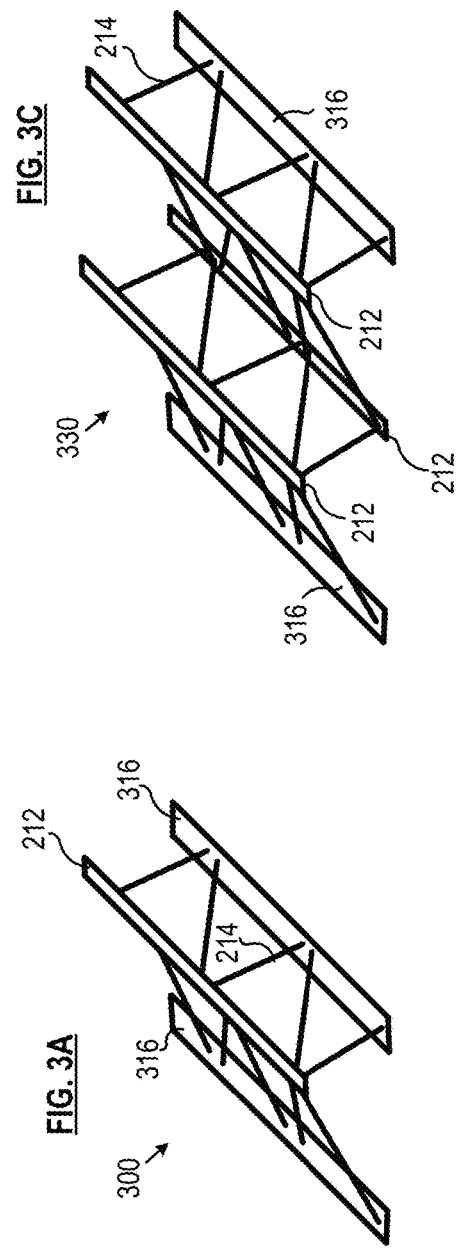

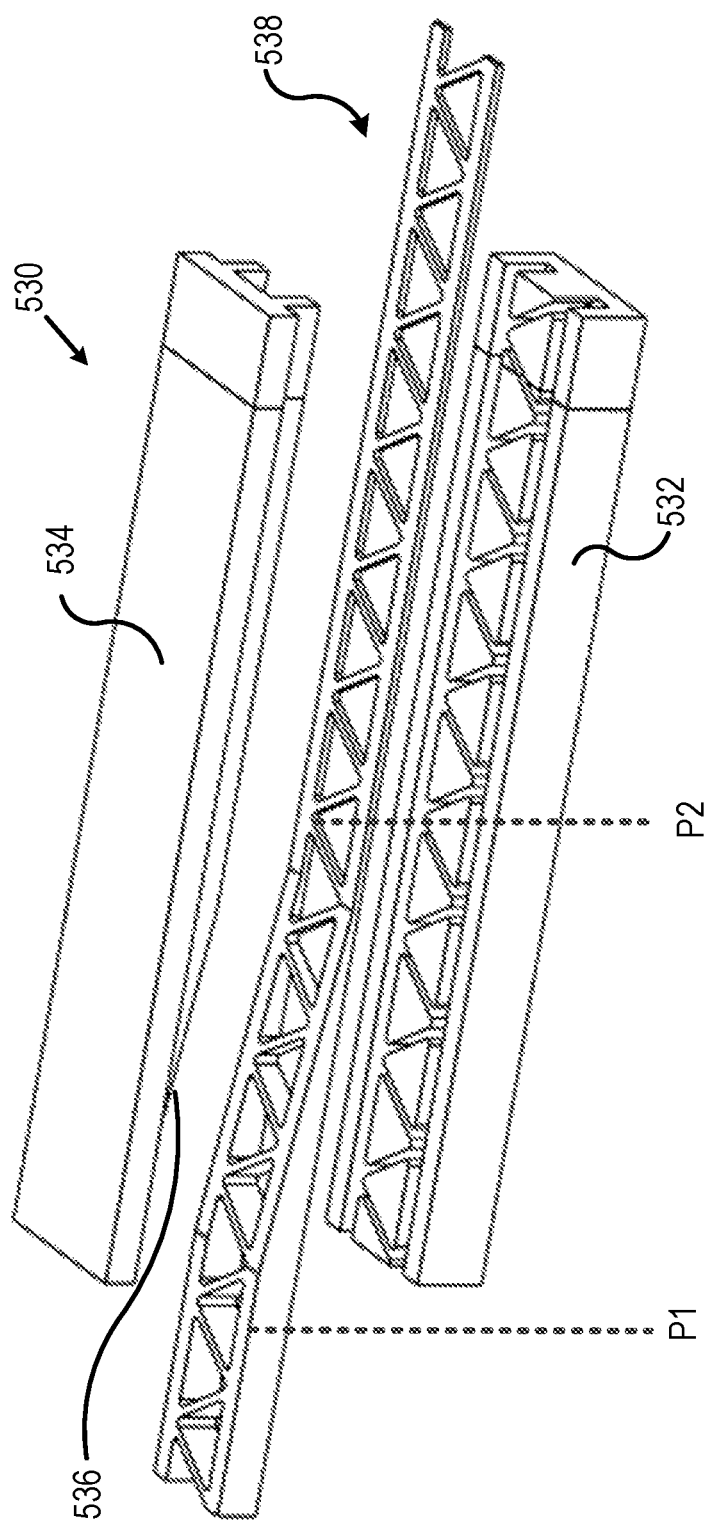

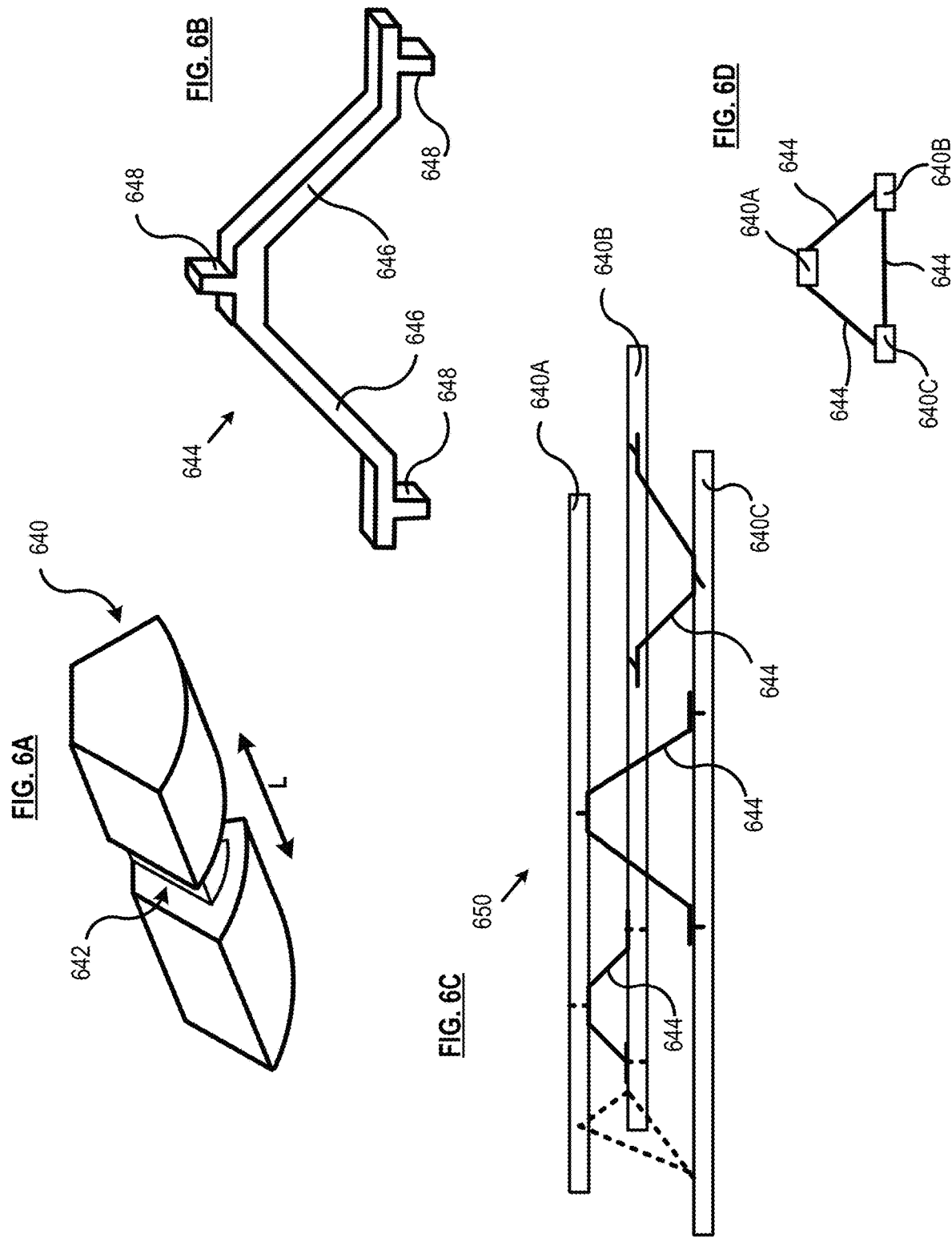

METHOD FOR COMPOSITE TRUSS MANUFACTURING

STATEMENT OF RELATED CASES

This specification claims priority of U.S. Pat. App. Ser. No. 63/065,705, filed Aug. 14, 2020 and incorporated by reference herein.

FIELD OF THE INVENTION

The present invention relates to the manufacture of fiber-composite parts.

BACKGROUND

Beams and trusses are commonly employed in structural applications with weight and material cost constraints.

The preferred method of fabrication for beams of composite material (i.e., fiber and resin) having continuous, unidirectionally aligned fibers is continuous compression molding (CCM). Design and engineering of CCM die geometry has enabled fabrication of beams of various cross sections (e.g., C-, I-, and H-shape, closed-shape [square, rectangular, etc.]) with advantageous second moments of area. But CCM processes are limited to having unidirectional fibers and constant cross sections.

Other methods of fabrication include filament winding and braiding. Filament-wound beams are produced via a rotating mandrel and roving fiber feeds, and are consolidated in an autoclave after the winding process. Depending on mandrel geometry and the degree of control over fiber roving, such beams can have a non-constant cross section along their length. Due to the misalignment between the mandrel rotation axis and fiber-feed axis, however, they cannot have unidirectional fiber alignment, nor can fibers be aligned to the major axis of the beam. Each of these constraints have negative performance implications in certain applications.

Braiding machines can produce closed-shape beams with axially-aligned fibers as well as off-axis fibers. Such beams are braided over a mandrel and therefore can have a non-constant cross-section along their length. After braiding, the parts are consolidated in an autoclave or via resin transfer. The braiding machines are complex, expensive, and relatively slow.

Fiber-composite trusses, which can be fabricated to have various lattice geometries, are distinct from the aforementioned beams but satisfy similar objective. The advantage of such truss structures over the former processes is that their lattice geometry and non-constant cross section enable larger effective diameters, and thus larger second moments of area, at equal or lesser weights than beams. The disadvantages are that such truss structures have been more costly to produce, and are not subject to high pressure during manufacturing such that the constituent materials are less consolidated.

All of the aforementioned processes are mutually exclusive; consequently, the benefits of one cannot be combined with those of another. The prior art thus lacks a manufacturing method capable of producing a fiber-composite truss having a) continuous fibers that vary in orientation along its length, b) a non-constant cross section, and c) a high degree of consolidation resulting from applied heat and pressure.

SUMMARY

The present invention provides a way to fabricate truss structures from composite materials wherein the trusses have both continuous and variably aligned fibers, non-constant cross sections, and a high degree of consolidation. Methods in accordance with the invention enable the fabrication of trusses having greater continuous fiber length and better specific performance (on a unit mass basis), and at lesser cost, than those of the prior art.

Truss and beam performance is determined to a large extent by the second moment of area (also referred to as the "second area moment" and the "area moment of inertia"). The second moment of area is a geometrical property of an area that reflects how its points are distributed with regard to an arbitrary axis. In structural engineering, the second moment of area of a beam is used to calculate a beam's deflection, and the calculation of stress caused by a moment applied to the beam. The planar second moment of area provides insight into a beam's resistance to bending due to an applied moment, force, or distributed load perpendicular to its neutral axis, as a function of its shape. The polar second moment of area provides insight into a beam's resistance to torsional deflection, due to an applied moment parallel to its cross-section, as a function of its shape.

In accordance with the relevant solid-mechanics equations, the outermost areas of the cross section of a beam or elements of a truss have the greatest contribution to its mechanical performance when subject to a bending moment. For example, relative to a solid cylindrical cross section, a hollow tube of equal area and greater outer diameter will have a greater second moment of area. This is attributable to the greater amount of material further from the neutral axis. Similarly, in order to maximize the second moment of area, a large fraction of the cross-sectional area of an I-beam is located at the maximum possible distance from the centroid of the I-beam's cross-section.

While the second moment of area is a purely geometric property, the determination of a beam's mechanical performance is also a function of its material properties. In a composite material, the matrix (resin) possesses isotropic material properties, whereas the fibers present anisotropic properties that largely define the performance of the part. By controlling the orientation of the fibers, one skilled in the art can improve aspects of the performance of a composite part. For example, aligning fibers along the anticipated in-use principal stress vector(s) of the part maximizes structural performance of the part. As such, consideration of anisotropy is critical to fiber-composite beams and trusses.

Across all relevant applications, many different load cases exist (e.g., simple bending, torsion, etc.), so fiber orientation in the beam/truss is an important design parameter. To address the shortcomings of the art in regards to both fiber orientation and cross section along the length of a beam or truss, the inventors have developed the present methods.

In a first embodiment in accordance with the present teachings, a fiber-composite truss is fabricated by individually molding multiple unit cells of a given size, and subsequently fusing them together in a repeating pattern. In a second embodiment, a progressive molding process is employed in which stiffening ribs (cross members) are consolidated with relevant beams (longerons). In a third embodiment, molded truss components are unioned to continuous fiber beams by means of mechanically interlocking joints.

BRIEF DESCRIPTION OF THE DRAWINGS

FIG. 2 depicts a fiber-composite truss.

FIG. 3A depicts an embodiment of a unit cell for use in fabricating the fiber-composite truss of FIG. 2.

FIG. 3B depicts a method for forming the fiber-composite truss of FIG. 2 using the unit cell of FIG. 3A.

FIG. 3C depicts an alternative embodiment of a unit cell for use in fabricating the fiber-composite truss of FIG. 2.

FIG. 3D depicts a method for forming the fiber-composite truss of FIG. 2 using the unit cell of FIG. 3C.

FIG. 3E depicts a mating feature for use with the unit cells of FIGS. 3A and 3C.

FIG. 4A depicts fiber alignment within the fiber-composite truss of FIG. 2

FIG. 4B depicts fiber alignment in a portion of a longeron of the fiber-composite truss of FIG. 2.

FIG. 5 depicts a method for forming a truss using a linearly actuated die.

FIG. 6A depicts a longeron including a female joint for mechanically engaging a cross member/unit cell, in accordance with the present teachings.

FIG. 6B depicts a unit cell including a male joint for mechanical engaging the longeron of FIG. 6A.

FIG. 6C depicts a truss resulting from mechanically coupling plural instances of the unit cell of FIG. 6B to the three instance of the longerons of FIG. 6A.

FIG. 6D depicts an end view of the truss of FIG. 6C.

DETAILED DESCRIPTION

Figure 1A:
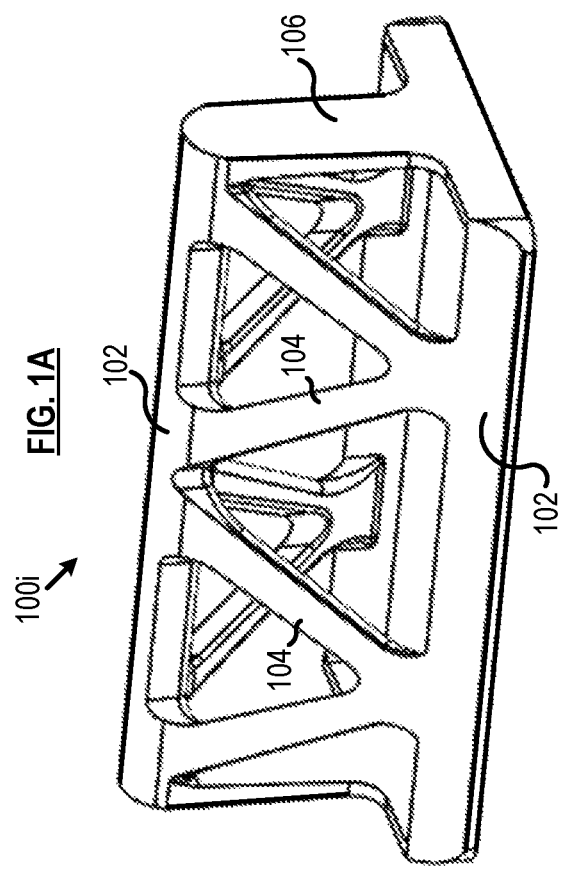
FIG. 1A depicts an embodiment of a unit cell for use in fabricating a fiber-composite truss.

Definitions. The following terms are defined for use in this description and the appended claims:

"Fiber" means an individual strand of material. A fiber has a length that is much greater than its diameter. For use herein, fibers are classified as (i) continuous or (ii) short. "Continuous fibers" have a length that is no less than about 60 percent of the length of a mold feature or part feature where they will ultimately reside. Hence, the descriptor "continuous" pertains to the relationship between the length of a fiber and a length of a region in a mold or part in which the fiber is to be sited. For example, if the long axis of a mold has a length of 100 millimeters, fibers have a length of about 60 millimeters or more would be considered "continuous fibers" for that mold. A fiber having a length of 20 millimeters, if intended to reside along the same long axis of the mold, would not be "continuous." Such fibers are referred to herein as "short fibers." The term "short fiber," as used herein, is distinct from the "chopped fiber" or "cut fiber," as those terms are typically used in the art. In the context of the present disclosure, short fibers are present in a preform (of the same length), and substantially all short fibers in the preform are unidirectionally aligned. As such, the short fibers will have a defined orientation in the preform layup or preform charge in the mold and in the final part. As used in the art, "chopped" or "cut" fiber has a random orientation in a mold and the final part. Returning to the example of the 20-millimeter fiber, it is notable that if that fiber is intended for a feature in the mold having a length of about 20 millimeters, then the fiber would be considered to be "continuous." For features that are smaller than the overall size of the mold, the fibers will typically be somewhat longer than the feature, to enable "overlap" with other fibers. For a small feature, the overlap amount could represent the major portion of the length of the fiber.

"Fiber bundle" means plural (typically multiples of one thousand) unidirectionally aligned fibers.

"Compatible" means, when used to refer to two different resin materials, that the two resins will mix and bond with one another.

"Stiffness" means resistance to bending, as measured by Young's modulus.

"Tensile strength" means the maximum stress that a material can withstand while it is being stretched/pulled before "necking" or otherwise failing (in the case of brittle materials).

"Tow" means a bundle of unidirectional fibers, ("fiber bundle" and "tow" are used interchangeably herein unless otherwise specified). Tows are typically available with fibers numbering in the thousands: a 1K tow, 4K tow, 8K tow, etc.

"Prepreg" means fibers, in any form (e.g., tow, woven fabric, tape, etc.), which are impregnated with resin.

"Towpreg" or "Prepreg Tow" means a fiber bundle (i.e., a tow) that is impregnated with resin.

"Preform" means a segment of plural, unidirectionally aligned fibers. The segment is cut to a specific length, and, in many cases, will be shaped (e.g., bent, twisted, etc.) to a specific form, as appropriate for the specific part being molded. Preforms are usually sourced from towpreg (i.e., the tow-preg is sectioned to a desired length), but can also be from another source of plural unidirectionally aligned fibers (e.g., from a resin impregnation process, etc.). The cross section of the preform, and the fiber bundle from which it is sourced typically has an aspect ratio (width-to-thickness) of between about 0.25 to about 6. Nearly all fibers in a given preform have the same length (i.e., the length of the preform) and, as previously noted, are unidirectionally aligned. The modifier "fiber-bundle-based" is often pre-pended, herein, to the word "preform" to emphasize the nature of applicant's preforms and to distinguish them from prior-art preforms, which are typically in the form of segments of tape or in the form of a shape cut from sheets of fiber. Applicant's use of the term "preform" explicitly excludes any size of shaped pieces of: (i) tape (typically having an aspect ratio—cross section, as above—of between about 10 to about 30), (ii) sheets of fiber, and (iii) laminates. Regardless of their ultimate shape/configuration, these prior-art versions of preforms do not provide an ability to control fiber alignment in a part in the manner of applicant's fiber-bundle-based preforms.

"Consolidation" means, in the molding/forming arts, that in a grouping of fibers/resin, void space is removed to the extent possible and as is acceptable for a final part. This usually requires significantly elevated pressure, either through the use of gas pressurization (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of (fiber-bundle-based) preforms that are at least loosely bound together ("tacked") so as to maintain their position relative to one another. Preform charges can contain a minor amount of fiber in form factors other than fiber bundles, and can contain various inserts, passive or active. As compared to a final part, in which fibers/resin are fully consolidated, in a preform charge, the preforms are only partially consolidated (lacking sufficient pressure and possibly even sufficient temperature for full consolidation). By way of example, whereas applicant's compression-molding processes are typically conducted at about 1000 to 3000 psi (which will typically be the destination for a preform-charge in accordance with the present teachings), the downward pressure applied to the preforms to create a preform charge is typically in the range of about 10 psi to about 100 psi. Thus, voids remain in a preform charge, and, as such, the preform charge cannot be used as a finished part.

"Planar" means having a two-dimensional characteristic. The term "planar" is explicitly intended to include a curved but otherwise featureless planar surface.

"About" or "Substantially" means +/−20% with respect to a stated figure or nominal value.

Feed Constituents. A preform charge, as is used in some embodiments to form trusses in accordance with the present teachings, comprises a plurality of preforms. Preforms are typically formed from towpreg, but may also be sourced from the output of a resin impregnation line. To form a preform from towpreg or the output of a resin infusion line, the towpreg is cut into segments of a desired size and often shaped as well. Each preform include thousands of unidirectionally aligned, resin-infused fibers, typically in multiples of one thousand (e.g., 1 k, 10 k, 24 k, etc.). A preform may have any suitable cross-sectional shape (e.g., circular, oval, trilobal, polygonal, etc.).

The individual fibers in the towpreg/preforms can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Furthermore, carbon nanotubes can be used.

Any resin—thermoplastic or thermoset—that bonds to itself under heat and/or pressure can be used. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). An exemplary thermoset is epoxy.

A single preform charge can comprise preforms that have fibers and/or resins that are different from one another. It is preferable to have the resin be the same through all preforms in a preform charge, but this is not necessary as long as the different resins are "compatible;" that is, as long as they bond to one another. A preform charge can also include inserts that are not fiber based.

The preform charge, which is typically a three-dimensional arrangement of preforms, is usually created in a fixture separate from the mold used to form a final fiber-composite part, and which is dedicated and specifically designed for that purpose. To create a preform charge, preforms are placed (either automatically or by hand) in a preform-charge fixture. By virtue of the configuration of the fixture, the preforms are organized into a specific geometry and then bound together, such as via heating and minimal applied pressure. The shape of the preform charge usually mirrors that of the intended part, or a portion of it, and, hence, the mold cavity (or at least a portion thereof) that forms the part. See, e.g., Publ. Pat. Apps. US2020/0114596 and US2020/0361122, incorporated herein by reference. The preform-charge fixtures disclosed herein, which include features that uniquely address the challenges required to fabricate certain geometrically complex parts as discussed herein, are unlike those described in the referenced publications.

As compared to a final part in which fibers/resin are fully consolidated, in a preform charge, the preforms are only partially consolidated. This is because there is insufficient pressure, and possibly even insufficient temperature for full consolidation. By way of example, whereas applicant's compression-molding processes are often conducted at a pressure of thousands of psi, the downward pressure applied to the constituents to create a preform charge in accordance with the present teachings is typically in the range of about 10 psi to a maximum of about 500 psi. Thus, voids remain in a preform charge, and, as such, the preform charge cannot be used as a finished beam or truss. Although a preform charge is not fully consolidated, the preforms in a preform charge will not move, thereby maintaining the desired geometry and the specific alignment of each preform in the assemblage.

As an alternative to using a preform charge, a layup (having the same configuration as the preform charge) of individual preforms is created in the mold cavity. A lay-up is, in fact, the traditional approach for positioning feed constituents in a compression mold. But for both process efficiency as well a substantially greater likelihood that the desired preform alignment is maintained, the use of a preform charge is preferred. As used in this disclosure and the appended claims, the term "assemblage of preforms" means either a "preform charge" or a "layup" of preforms, unless otherwise indicated.

Design Considerations. By optimizing the areal distribution of material across a beam or truss's cross section, it's mechanical performance can be maximized. Relative to a solid beam of equal effective diameter, a beam or truss having a cross section with an optimal second moment of area (e.g., C-shape, I-shape, H-shape, etc., depending on relevant load conditions) will have greater specific performance (i.e., bending stiffness per unit mass).

A beam is regarded as a longitudinal member (i.e., length>>effective diameter) having a geometrically continuous, and constant, cross section. That is, at any plane intersecting the beam (orthogonal to its major axis) at any point along its length, the cross section will be a single form (e.g., C, H, I, square, rectangular, triangular, etc.) of a given thickness.

A truss is regarded as a longitudinal member in which such planes intersect more than one closed-form geometry. Although the closed forms are separate at a given cross section, the longitudinal geometry of the truss unites them all into a common volume. Closed forms that vary in position between intersecting planes are herein referred to as cross members, and those of constant position are referred to as longerons. For trusses in which cross members are consolidated onto longerons, the single closed-form cross section will vary in geometry across all intersection planes.

As noted above, in addition to consideration of the second moment of area, composite beams and trusses can be further optimized via fiber alignment. That is, a beam in simple bending may benefit from fibers that are unidirectionally aligned along its length, whereas a truss in torsion may instead benefit from fibers aligned at varying angles with respect to its major axis.

Fiber-composite trusses present certain materials related advantages over composite beams, wherein the advantages are primarily attributable to anisotropy. Specifically, aligned fibers in cross members that connect longerons to one another generally enable composite trusses to have increased specific performance over composite beams. So, from a mechanical perspective, longerons are spaced to maximize (to the extent practical) the second moment of area. And from a materials perspective, anisotropy enables aligned-fiber cross members to resist shear stress displacement of the longerons relative to one another. Thus, cross members, in conjunction with longerons, meet performance requirements using less material than a closed-form beam, via load transmission between longerons.

This observation, along with the capability of relevant processes, motivated the present approach. Embodiments of the invention enable production of trusses having:
1) continuous fibers of varying orientation;
2) non-constant cross-sectional geometry (i.e., not a beam, per definition); and
3) a high degree of consolidation.

In accordance with the present teachings, composite trusses are fabricated via any of the following embodiments:
a) the unification of mating "unit cells" into a repeating pattern; or
b) a progressive molding process that consolidates aligned-fiber cross members with continuous fiber longerons; or
c) unioning of continuous-fiber longerons to planar cross members via mechanically interlocking joints.

A. Unification of unit cells into a repeating pattern. (FIGS. 1A-1B, 2, 3A-3E, and 4A-4B.) This approach to fiber composite truss fabrication is particularly well suited for high-volume production applications. Due to tooling-cost constraints discerned by the applicant during truss process-development efforts, the truss unit cells are advantageously limited in size to those have a length in a range of between about six to twenty-four inches (although unit cells as large as eight feet have been produced by applicant).

FIG. 1A depicts a first exemplary unit cell—unit cell 100$i$—for fabricating of a fiber-composite truss. Unit cell 100$i$ includes a plurality of longerons 102 (there are three of them in unit cell 100$i$), cross members 104, and end faces 106. Each end face, which in the illustrative embodiment has a flat planar surface, functions as a mating surface to which another unit cell 100$i$ can be attached to "grow" a truss. In various other embodiments, a truss can have as few as two longerons, or more than three longerons.

Figure 1B:
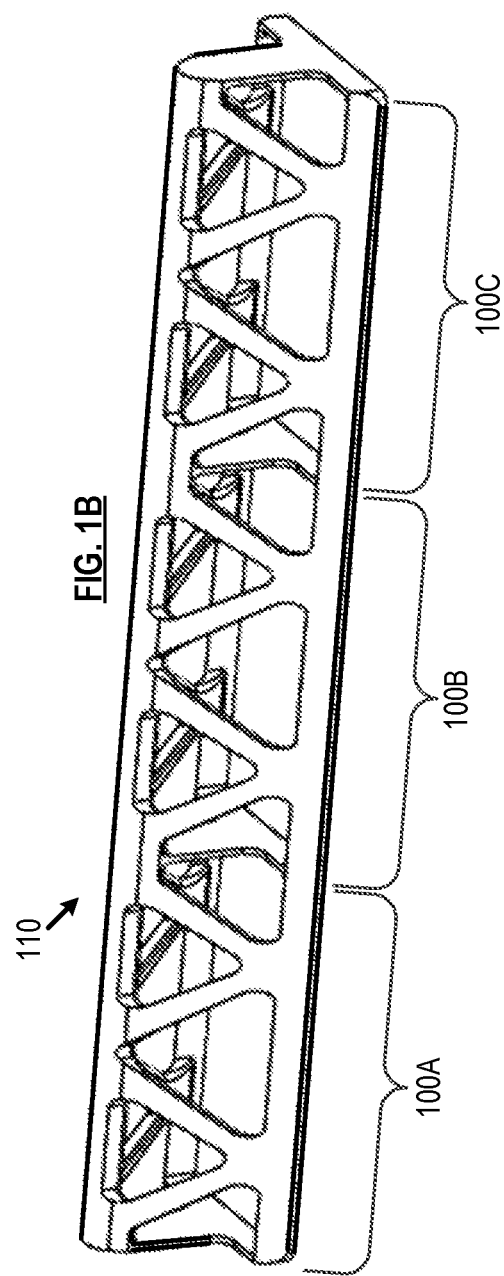
FIG. 1B depicts a fiber-composite truss formed using plural instances of the unit cell of FIG. 1A, and in accordance with an illustrative embodiment of the invention.

FIG. 1B depicts truss 110, which is formed by mating a plurality of unit cells 100I (i.e., unit cells 100A, 100B, and 100C) together at their respective end faces 106. A three unit-cell truss is depicted in FIG. 1B; typically, the truss would include many more such unit cells. The unification of individual unit cells can be accomplished via thermal-bonding techniques for composites. These include, without limitation, friction welding, ultrasonic welding, and/or induction welding.

The molded unit cells can be planar or nonplanar, provided their geometry is suitable for compression molding. Using applicant's compression-molding processes, in conjunction with applicant's fiber-bundle-based preforms (in the form of an appropriately configured layup or preform charge), enables aligned fibers within cross members to run continuously into longerons. This increases structural integrity. Additionally, longerons include continuous fibers aligned to their own major axis. While discontinuity of longeron fibers between unit cells limits the performance of trusses formed in accordance with this approach, it enables economical, high-volume production of unit cells by virtue of limited tooling size.

In addition to considerations of: (i) the geometry of the unit-cell and (ii) fiber alignment, the performance of trusses manufactured via embodiment a) is also reliant on the integrity of unification of unit cells. Design considerations to achieve such integrity include particular mating geometries, fiber-alignment features, and thermal-bonding techniques. When subjected to appropriate thermal-bonding techniques, the mating geometries and fiber-alignment features act to best unify unit cells along their interface.

Mating geometries are considered any aspects of individual unit cells that facilitate registration and/or interlocking to adjacent unit cells. Examples of such mating geometries include slots, complementary angles in cross-section interfaces, and the like. They are generally common across all unit cells for a given truss, but can vary in certain embodiments provided that adjacent unit cells possess corresponding features.

For planar unit cells forming planar trusses, such mating geometries are generally present at either end, thereby unifying them analogously to segments of railroad track.

A variety of different fiber-alignment features can be utilized for different applications, depending on mechanical performance requirements dictating the unification of unit cells. To at least some extent, all implementations of fiber-alignment features promote fiber engagement across abutting interfaces during thermal bonding of unit cells into a repeating pattern. As fiber engagement is advantageous along the interface between adjacent unit cells, fiber-alignment features are present, but not required, in mating geometries.

Nonplanar and/or planar unit cells forming nonplanar trusses can possess mating geometries along their sides, in addition to being present at either end. FIG. 2 depicts truss 210, which can be formed from a plurality of unit cells having a delta/chevron shape (i.e., an open triangle). Truss 210 includes longerons 212, cross members 214, and longerons 216. The distinction between longerons 212 and 216 is discussed further below.

FIG. 3A depicts unit cell 300, which is an exemplary embodiment of such a chevron shape unit cell suitable for forming truss 210. Unit cell 300, which is formed via compression molding, includes longeron 212, cross members 214, and longerons 316. To form truss 210, two instances of unit cell 300 are positioned as depicted in FIG. 3B, with longerons 316 from the first instance of unit cell 300 opposing longerons 316 of the second instance of unit cell 300. The opposing longerons are thermally bonded to one another, creating longeron 216 (see FIG. 2). Since two longerons 316 are combined to form longeron 216, longerons 316 are about half the thickness of longeron 216.

FIG. 3C depicts unit cell 330, which is another exemplary embodiment of a unit cell suitable for forming truss 210. Unit cell 330 includes three longerons 212, cross members 214, and longerons 316. Unit cell 330 is essentially two instances, positioned end-to-end, of unit cell 300, and for that reason, its geometry is referred to as a "double chevron shape." It is notable, however, that two of unit cells 300 are not coupled to form unit cell 330. Rather, unit cell 330 is created as a unitary structure by compression molding. As depicted in FIG. 3D, to form truss 210 from unit cell 330, the unit cell is heated, and then folded around middle longeron 212. To facilitate folding, in some embodiments, middle longeron 212 is thinned along its length near the longitudinal centerline thereof, effectively creating a fold line. Folding in this fashion ultimately brings the two longerons 316 into opposing relation with one another. The opposing longerons are then thermally bonded to one another, creating longeron 216.

To facilitate joinder of half-thickness longerons 316, these longerons are, in some embodiments, provided with mating features. One example of such a mating feature is mating feature 318 shown in FIG. 3E. This mating feature is created by the angles/walls formed across the width of the longerons 316. Mating feature 318 is mechanical; that is, the structure of the cooperating longerons facilitates alignment and coupling.

FIG. 4A depicts a cross section of truss 210 of FIG. 2A, depicting, in stylized form, the alignment of fibers therein. A plurality of fibers 420, substantially aligned with the long axis of cross members 214, are disposed therein. Fibers 420 are continuous, spanning the length of cross member 214. A plurality of fibers 422, substantially aligned with the long axis of longeron 212, are disposed therein. These fibers, which run "into the page" in FIG. 4A, are continuous to the extent of the unit cell, running from one end of longeron 212 to the other end. During compression molding to form the unit cell, the ends of some fibers 420 in cross member 214 intermingle with fibers 422 in longeron 212. Such overlap enhances mechanical strength. It is notable that in some embodiments, the assemblage of preforms in the unit cells (e.g., unit cell 300, 330) are arranged so that some fibers from a given cross member run into longerons, run along their length, and exit back to another cross member.

It is advantageous to promote fiber engagement across unit-cell interfaces; in other words, to create fiber engagement between unit cells that are being joined to one another. This can be facilitated by various physical adaptations, such as foldable tabs (implemented as longerons 316), local "flowable fibers," and/or consolidation rivets. Such features may be used together; none are mutually exclusive to any other. During thermal-bonding processes, all such features deform to provide the necessary unification of unit cells.

Consider truss 210 of FIG. 2. As previously discussed, this truss can be formed by combining two of unit cells 300 (see FIG. 3B). Truss 210 can be extended by combining another two of unit cells 300 and adding the result to truss 210 by thermal bonding at end face 219 of longerons 212 and end face 218 of longerons 216. When exposed to heat and pressure during thermal bonding, the fibers 422 in longerons 212 of truss 210 intermingle with those of opposing longerons 212 in the other pairing of unit cells 300. The same is true for opposing longerons 216.

Recall that longeron 216 results from the combination of two longerons 316 (see, e.g., FIG. 3B). Continuous fibers 422 are running along the length of longerons 316, which is orthogonal to the direction of bonding. With continuing reference to FIG. 4A, longeron 216 includes relatively shorter fibers 424 in region A. Some of these fibers are sourced from one of the two opposing longerons 316 that form longeron 216, and others are sourced from the other longeron 316. During thermal bonding of longerons 316, the short fibers from the opposing longerons overlap and interlock, as depicted in FIG. 4B.

In this fashion, some intermingling of fiber between unit cells is created along multiple axes.

The use of such short, off-axis fibers for molding applications is disclosed in U.S. Pat. Nos. 10,926,489; 10,946,595; and Publ Pat App. US2021/0187879, all of which are incorporated by reference herein.

Furthermore, in some other embodiments, sacrificial consolidation features (e.g., rivets, etc.) are composed of local flowable (short) fibers. Similar to traditional metal rivets, these deform during thermal bonding to interlock adjacent unit cells.

Trusses produced via embodiment (a) (i.e., unification of unit cells) do not necessarily require a consistent unit-cell pattern along their entire length. That is, provided all adjacent unit cells interface appropriately, the unit cells can vary in geometry at different longitudinal locations along the truss. For example, a high-stress segment of a given truss can have a stronger unit cell configuration (e.g., a greater number of cross members per unit length, thicker cross members, cross members having a certain fiber type, etc) than a lower stress segment located elsewhere. Regardless of patterns and configurations, there is no limit to how many unit cells can be unified into a single truss.

B. Consolidation of aligned-fiber cross members with continuous fiber longerons. (FIG. 5.) Performance shortcomings of a truss formed in accordance with embodiment (a) might arise due to the possibility of fiber discontinuities between unit-cell longerons. More particularly, even though fibers from adjacent unit cells do intermingle, fibers are not "continuous" across multiple unit cells.

The embodiment depicted in FIG. 5, which discloses a "progressive" molding process, addresses this issue. It is notable that the prior art can produce only composite beams with unidirectionally aligned fibers via continuous compression molding ("CCM"). By contrast, the embodiment depicted in FIG. 5 provides a way to incorporate, into a truss, cross members having continuous fibers of varying orientation.

Furthermore, incorporation of such aligned-fiber cross members results in longitudinally non-constant cross sections. Per the definitions provided herein, this progressive molding process is therefore distinguishable from CCM on at least this basis, since the present process manufactures trusses, as opposed to beams. Aligned-fiber cross members can be consolidated under heat and pressure with one or two faces of a given longeron profile.

The longeron face(s) onto which the cross member(s) is/are consolidated is determined by the loading conditions of a given application. For example, a longeron having an "I"-shaped profile may have cross members consolidated onto either face of its central segment for reinforcement. In another embodiment, a longeron having a "C"-shaped profile may have cross members consolidated onto the outer face of its central segment. Cross members can be consolidated onto longerons or replace the material between them.

In accordance with the present teachings, composite trusses, rather than beams, are fabricated by means of specialized dies, which serve to consolidate preform layups or preform charges with longerons having unidirectional fibers. The longerons of the resultant truss are thus a blend of unidirectional fibers along the length of the longeron and aligned fibers running into/from cross members.

As the progressive molding apparatus advances longeron feedstock material forward, material handling robots position cross-member precursor preforms or preform charges accordingly along the desired face(s). While subject to heat and pressure within the die(s), fibers within the longeron material are kept in tension, while those within cross members are tensioned via positive pressure gradients created in the molding apparatus.

The longeron material (e.g., plural lengths of towpreg, etc.) can be consolidated together in either the same die as the cross members, or in a separate upstream die. In the latter embodiment, successive dies then consolidate the cross members with the longerons.

The die tooling for applicant's progressive molding embodiment can either: (1) consolidate a preform charge into a final truss, or (2) first union preforms together into a preform charge, and subsequently into a final truss. The manifestation of a given embodiment is dependent on the length of its die tooling. That is, partially consolidating preforms into a preform charge, and then consolidating the preform charge(s) into a truss requires a longer progressive die to gradually achieve the necessary consolidation, relative to simply consolidating a preform charge to truss.

The specialized dies that enable fiber-composite truss production via the present progressive molding method are designed to be the "negative" shape of a relevant cross section of the truss at the point or segment at which heat and pressure are applied. That is, similar to closed die molds, these dies form the cross section against a negative contour, except they aren't closed on all sides, thereby enabling a continuous advance of input material without longeron fiber discontinuities.

The method is referred to as "progressive" because the die geometry changes as material continues to advance through the process. Dies downstream of the initial forming die will consolidate the material to a successively greater degree, until the material reaches the final geometry. Heating and cooling between forming stages is applied appropriately so as to meet material handling constraints.

These dies can be rotary, linearly actuated, or a combination of both. As previously noted, the dies used herein for progressive molding are partially open, enabling the longerons to have continuous fibers of effectively unlimited length.

Rotary embodiments of such dies exhibit a continuous helical, spiral, or zig-zagged channel along their face, analogous to a barber's pole or oscillating path of a winding fishing reel. As the die rotates at an angular velocity corresponding to the linear feed rate of the input material, its radial cross section (i.e., negative of half the longeron profile) consolidates the longeron while the oscillating channel consolidates cross members onto the longeron.

Any rotary die has a complementary rotary die to consolidate material via applied pressure, and both are energized to apply heat. The dies are shaped and spaced such that the gap between them forms the shape of the truss. At every angular position of a rotary die having channels, the channel position corresponds to the varying position of the cross member. Such die sets are arranged in succession to progressively consolidate material as it advances through them.

In some alternative embodiments, linearly actuated dies are used. Such dies are actuated at regular intervals to gradually form discrete truss segments with every actuation. The advancement of input material can either be paused during the actuation, or the die(s) can translate with the progressive molding apparatus at an equal rate to the material.

Linearly actuated dies achieve progressive consolidation by virtue of their geometry. Unlike rotary die sets that are separated by progressively decreasing gaps, linearly actuated dies exhibit a forming region having a continually decreasing cross section. An example of a linearly actuated die is die 530, depicted in FIG. 5. Die 530 includes female portion 532 and male portion 534. Note the increase in the vertical extent of core member 536 of male portion 534 proceeding from left to right in the FIG. 5. This creates the consolidation gradient, which can be seen on nascent truss 538, comparing its thickness at upstream location P1 versus downstream location P2. This progressive consolidation occurs as the nascent truss is advanced through the die.

Whereas rotary dies continually apply forming pressure to advancing material, the pressure applied by linearly actuated dies is intermittent. To meet material handling constraints between forming actuations, the intermittent operations also necessitate appropriate thermal cycling (i.e., thermoplastic resin has to be near or below its glass transition temperature to advance without deformation, and then brought to melt temperature to be consolidated).

To ensure that consolidated material exits the dies below the glass transition temperature, regardless of the temperature of the forming part of the die, each die is formed from two materials. The forming part of the die comprises a thermally conductive material, whereas the exit portion of the die comprises a thermally insulative material. The width of the insulative material is engineered to keep the exit side below the glass transition temperature of the resin.

In various implementations of the method, one or more rotary die sets are used, or one or more linearly actuated die sets are used, or a combination of any number of rotary and linearly actuated die sets are used. A given embodiment's progressive die manifestation is specified by the necessary degree of consolidation and input material.

The die sets functions to successively heat and consolidate input material as it advances. That is, material can be gradually heated and consolidated into its final form across successively hotter and tighter die sets. In addition, die sets downstream of the maximum temperature die set can function to cool the material under pressure.

The quantity of die sets used is a function of the necessary heat transfer and consolidation required to manufacture a given truss. That is, for trusses requiring a high degree of consolidation, the total progressive die apparatus may be longer so as to be more gradual. Trusses formed from resin having high melt temperature may require a large number of die sets to provide the requisite amount of heat transfer.

The continuous nature of the progressive molding embodiment requires that trusses have a consistent cross member and longeron pattern along their entire length (i.e., die geometry is fixed). Furthermore, the process is limited in the cross sections that it can output. While the continuous-fiber longerons fabricated via this method offer high performance, they cannot, for example, manifest as any type of lattice structure.

C. Unioning of continuous-fiber longerons to planar cross members via mechanically interlocking joints. (FIGS. 6A-6E, 7, 8A-8C) To address the discontinuous fiber limitations of unit-cell trusses, and the geometric constraints of progressive molding, a third embodiment of composite truss manufacture has been developed. The third embodiment is a hybrid of embodiments (a) and (b), in which continuous fiber longerons are unioned to planar unit cells via mechanically interlocked joints. The joining architecture enables closed 'lattice' trusses that would otherwise be difficult or impossible to manufacture.

In accordance with the hybrid approach, female joints are created at longitudinal intervals along the length of continuous fiber longerons. The longeron profile (e.g., trapezoid, square, triangle, etc.) and joint geometry (e.g., slot, dovetail, etc.) can vary significantly per the needs of a given application. Such longerons may be produced by CCM processes, pultrusion impregnation, or the like, and/or via the previously described progressive molding method. FIG. 6A depicts longeron 640 having female notch or joint 642. Additional notches, not depicted, appear along length L of longeron 640 at prescribed intervals.

Depending on the number of faces/surfaces constituting a given truss, the joints of a relevant longeron may occur on one or more surfaces (e.g., on a single surface for a "flat" truss, two or more surfaces for polygonal trusses, etc.). From a cross section of a given truss, the longerons can be considered vertices whereas the cross members are edges, each of which connects to two vertices. (See, e.g., FIG. 6D.) A truss having a triangular cross section, for example, would have longerons with joints on at least two sides to join cross members on each side.

Joints along a given longeron can be realized through numerous means. In certain embodiments, they can be formed via heat, pressure, and tooling during the production of a longeron. For example, in some embodiments, they are a geometric aspect of associated progressive molding dies. In other embodiments, they are subtractively machined out of CCM profiles by means known to the art. In all embodiments, relevant longerons will have non-constant cross sections by virtue of such joints.

The geometry and spacing of the longeron joints can vary significantly. Some embodiments may require dovetail joints, for example, while others may require slot joints. In certain embodiments, tighter joint spacing may be required in some truss segments whereas other segments may benefit from looser spacing. This geometry and spacing is a function of the cross members to be joined at each respective joint.

The cross members corresponding to the jointed longerons are created via additive molding methods. Molds having the necessary geometry, and preform layups or perform charges having the necessary fiber alignment, are used to compression mold the cross members. For efficiency, in some embodiments, the cross members exist in a repeating unit-cell pattern. In some other embodiments, multiple cross-member geometries are used in a single truss. The compression-molding process forms the male joint portion (in the cross members/unit cells) that interfaces with the female longeron joints. FIG. 6B depicts unit cell 644 having two cross members 646. Unit cell 644 includes male joint portions 648 for coupling with the female joints in a longeron.

Given appropriate compression-mold tooling, the fiber alignment, joint geometry, and cross member geometry can be varied to create different truss structures. For increased strength and stiffness in some trusses, cross members can be thick and tightly patterned. For less demanding applications, cross members can have more obtuse diagonals for reduced weight (due to fewer cross members). Provided the cross-member joints will properly interface with the corresponding longerons, any geometry or combination of geometries can be used.

FIG. 6C depicts truss 650 formed by coupling unit cells 644, having male joints 648, to three longerons 640A, 640B, and 640C each having corresponding female joints 642. Unit cells 644 are coupled to the longerons to create a truss having a triangular cross section, as best seen in FIG. 6D. To create this arrangement, unit cells are coupled between longerons 640A and 640B, between longerons 640B and 640C, and between longerons 640C and 640A. For clarity, in FIG. 6C, only one unit cell 644 is coupled to each pairing of longerons; in an actual truss, plural unit cells are coupled to each such pairing of longerons.

The use of mechanically interlocking joints provides assembly advantages. That is, instead of thermal cycling the interfacing geometries in the presence of applied pressure, they are instead joined mechanically. This enables a wider range of geometries at reduced tooling costs. Fiber discontinuities between cross members and longerons, however, are present at every joint. This is apparent in FIG. 7, which depicts cross members 744 coupling to longeron 740 via dovetail joints 745. Continuous fibers 722 are unidirectionally aligned with the long axis of longeron 740. Some of fibers 720 within the body of cross member 744 extend into the male portion of dovetail joint 745. But those fibers do not intertwine with fibers 722 in longeron 740.

While optimal properties of composites are generally realized through the joining of constituents under heat and pressure (i.e., melting resin to create a homogeneous structure through which to transmit stress), mechanical joints yield slightly decreased function but at a fraction of the cost. Since the matrix (solidified resin) remains rigid (i.e., not viscous), joint features can be unioned with ease via the mechanical apparatuses described herein.

Since fiber discontinuities exist at every joint, stress is instead transferred from longerons to cross members, and vice versa, by the interlocking geometry of relevant joints. Much like any press-fit component, intimate contact along the majority or entirety of interlocked joint surfaces transmits stress between bodies.

As stress is transferred through joints mechanically rather than through fibers, joint geometry is a critical consideration to truss function. For example, joints transmitting shear stress may have a different geometry than those transmitting bending stress. Provided the necessary interlocking motions can be achieved, any joint geometry is applicable. Further, joint performance benefits from tight tolerances between the male and female features.

In addition to optimal joint geometry to transfer stress between members, fiber alignment within male and female joint features is also important to truss performance. While geometry is critical to transfer stress across a joint interface, fiber alignment is critical to prevent failure within a single joint feature. Each joint embodiment is uniquely stressed against its mating feature, and thus benefits from appropriately aligned fibers There are a variety of ways by which to join longerons to cross members via their interlocking joints. The joining process serves to union cross members to longerons in a manner applicable to their common joint geometry. That is, the joining process provides a mechanical apparatus that inserts cross members into longerons, or vice versa.

A given joining process complies to the geometric assembly needs of a given joint architecture. Such assembly allows a joint to be unioned in a specific manner, while preventing or inhibiting separation under the primary loading conditions.

In light of the fact that cross members are unioned to longerons at two or more joints, their assembly is generally accomplished through relative linear translation. That is, neither longeron nor cross member can significantly rotate during assembly, but can only move linearly relative to one another. Joints that comply to such linear constraints can be as simple as slots, or as complex as those found in traditional Japanese wood joints.

In most implementations, the joining process is continuous, in that cross members are joined to longerons without pause. A material-handling apparatus continually inserts cross members into either the longerons themselves or onto a locomotive core that supports and registers them within the corresponding longerons until insertion is complete.

Figure 6E:
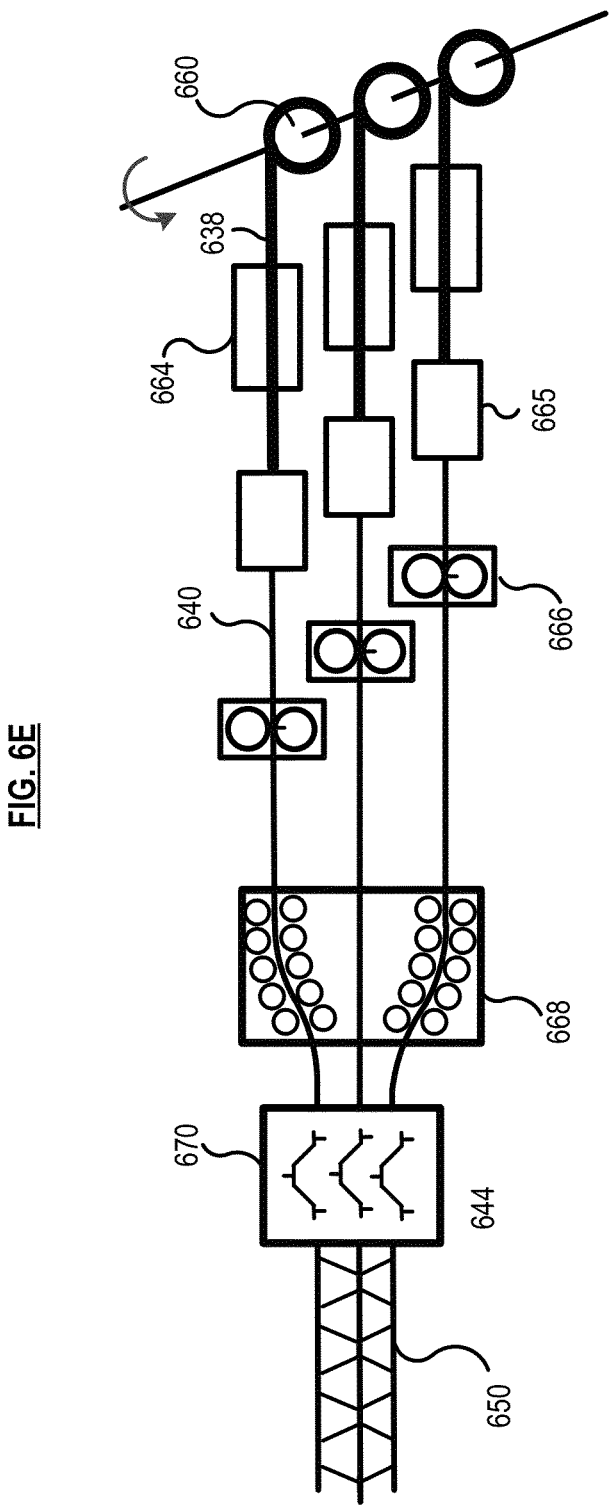
FIG. 6E depicts an assembly line for fabricating the truss of FIG. 6C.

FIG. 6E depicts an assembly line for creating a truss by attaching planar cross-members arrangements to continuous-fiber longerons via mechanically interlocking joints. The assembly line is configured to fabricate truss 650 having 3 longerons. Fiber tows 638 are dispensed from creels 660, forming three processing lines. Since each longeron is formed from multiple fiber tows 638, there are additional creels 660 feeding additional tows to the process. In other words, the plural fiber tows 638 in each processing line is effectively a "preform" for the longeron to be formed. The plural fibers in the plural fiber tows 638 in each processing line are impregnated with resin in (three) impregnators 664. The plural fibers tows 638 in each line are consolidated under heat and pressure in CCM dies 665 to form three longerons 640. After consolidation, the longerons are notched via (three) notching mechanisms 666, thereby providing the female portion of the mechanical joint in longerons. The longerons are aligned via inlet alignment 668 and pass to robotic assembly station 670 where three robots press fit cross member arrangements 644 to the three longerons.

Since joint fit tolerance is important to truss performance, the joints in many embodiments are press fit, thus providing as intimate surface contact as possible. Press fits can be progressively inserted, such that successive tooling further mates joints as material advances until fully interlocked. Progressive interlocking limits the relative rotation of bodies between joints.

Figure 8A:
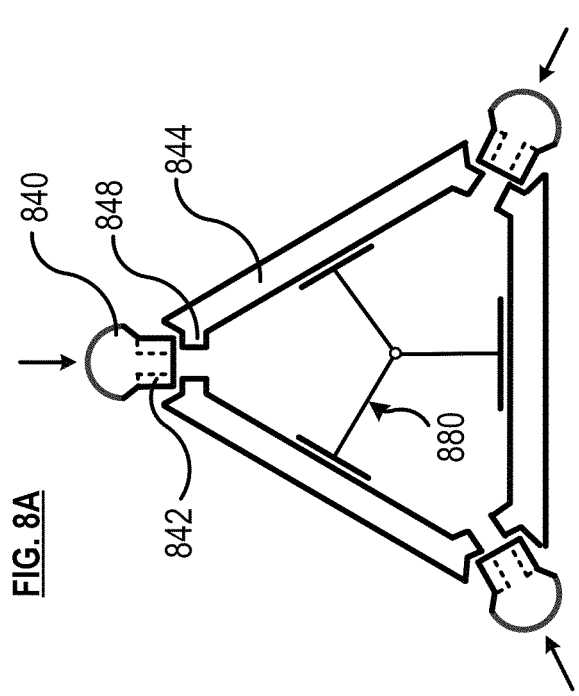
FIGS. 8A and 8B depict another embodiment of the use of joints to mechanically interlock longerons and units cells to form a truss.
Figure 8C:
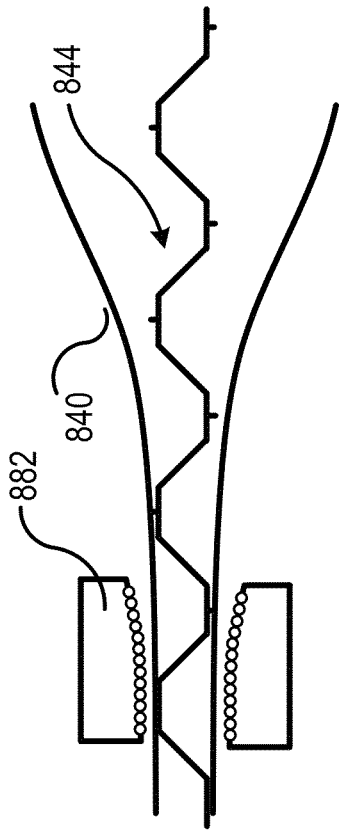
FIG. 8C depicts a method for use fabricating the truss of FIG. 8B.
Figure 7:
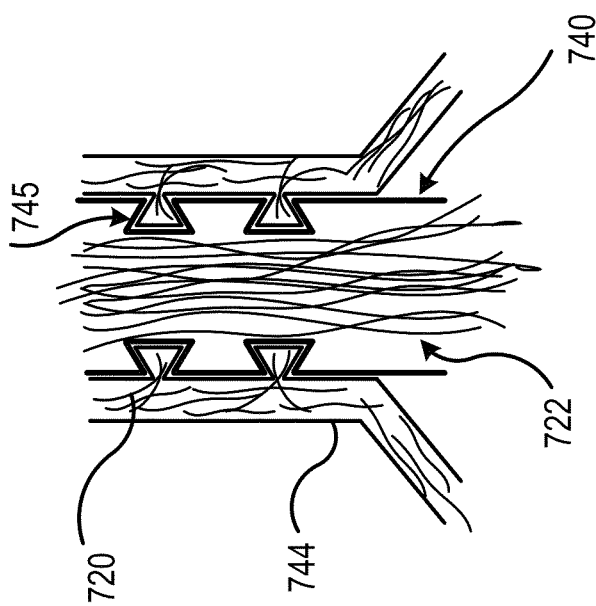
FIG. 7 depicts, for a mechanically interlocked longeron and unit cells, fiber alignment, illustrating the discontinuity between fibers in the unit cells and fibers in the longerons.
Figure 8B:
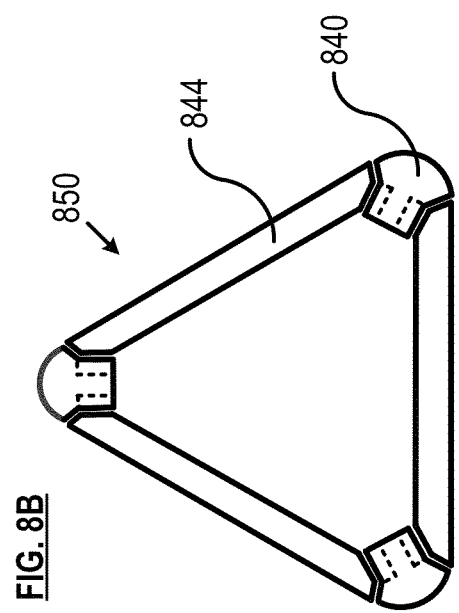

FIGS. 8A and 8B depict another embodiment in which longerons and cross members are coupled via mechanical joints. In this embodiment, the longerons are press fit to the unit cells, rather than the reverse, as depicted via the processing line of FIG. 6E.

Referring now to FIG. 8A, unit cells 844 are registered into position and held in place via collapsible core 880. Longerons 840 include female joints 842 for mechanically coupling to male joint 848 of unit cells 844. Force applied in the direction of the arrows presses longerons 840 into engagement with units cells 844, resulting in truss 850, as depicted in FIG. 8B.

FIG. 8C depicts an assembly method for coupling longerons 840 to unit cell(s) 844. Rollers 882, having a curved profile, are used to push the longerons against the unit cells to effect mechanical coupling. Since there is no heating taking place, there can be no intermingling of fibers as between the longerons and the unit cells. For clarity, the assembly method depicts the coupling of two longerons to a unit cell; another roller 882, another longeron 840, and two more unit cells 844 are required to create truss 850. The additional mechanical couplings can be performed simultaneously, or in series.

In addition to press fits of a purely mechanical nature as described above, in some embodiments, press fits that create friction that raises the temperature of the mating surfaces above their melt temperature result in a thermal bond that supplements the mechanical interlock. In such implementations, preheating elements can be used to bring the incoming material to elevated temperatures, from which friction resultant from the press-fit operation elevates exposed surfaces to temperatures at which thermal bonding occurs.

Joint bonding between longerons and cross members in further embodiments can also be achieved through means known to the art. Induction or friction welding, for example, can thermally bond joint interfaces. Alternatively, composite rivets or threaded fastener inserters can also be used to prevent joint separation.

Trusses manufactured via this hybrid embodiment thus display aligned fiber cross members that transmit stress to continuous fiber longerons through mechanically interlocking joints. Although such joints do exhibit fiber discontinuities between longerons and cross members, the engineered mechanical interlock ameliorates negative impacts on performance.

It is to be understood that the disclosure describes a few embodiments and that many variations of the invention can easily be devised by those skilled in the art after reading this disclosure and that the scope of the present invention is to be determined by the following claims.

What is claimed:

1. A method comprising:
    forming, via compression molding, a first unit cell having:
        (i) a first, second, and third longeron, each longeron having a first end and a second end, a distance between the first end and the second end defining a length of each longeron and a length of the first unit cell, each longeron comprising a plurality of continuous, unidirectionally aligned fibers having a length substantially equal to the length of the first unit cell, and wherein the three longerons are arranged in a three-dimensional chevron shape, wherein the first longeron is located at an apex of the chevron shape, and wherein a thickness of the second longeron and the third longeron is about one-half of the thickness of the first longeron;
        (ii) a plurality of cross members, each cross member having a first end and second end, a distance between the first and second end of a respective cross member defining a length thereof, each cross member comprising a plurality of continuous, unidirectionally aligned fibers having a length substantially equal to the length of the respective cross member, wherein:
  (a) the first end of each cross member couples to a first longerons, and wherein, at the first end of the cross members, at least some of the fibers overlap at least some of the fibers in the first longeron,
  (b) the second end of each cross member couples to either the second or the third longeron, and wherein at the second end of the cross members, at least some of the fibers overlap at least some of the fibers in the respective second or third longeron to which the second end of each cross member is coupled;

forming, via compression molding, a second unit cell, the second unit cell having first, second, and third longerons arranged in the chevron shape, wherein;
  (i) the first longeron in the second unit cell is located at the apex of the chevron shape,
  (ii) a thickness of the first longeron in the second unit cell is equal to the thickness of the first longeron in the first unit cell, and
  (iii) a thickness of the second longeron and the third longeron in the second unit cell is about one-half of the thickness of the first longeron;

forming, in the second and third longerons of the first and second unit cell, complementary mechanical mating features that facilitate alignment and coupling of the first unit cell to the second unit cell; and thermally bonding, along the length thereof, the second and third longeron of the first unit cell to the second and third longerons, respectively, of the second unit cell, thereby forming a first truss structure having four longerons of about equal thickness and a quadrilateral shape.

2. A method comprising:
forming, via compression molding, a first unit cell having:
  (i) a first, second, and third longeron, each longeron having a first end and a second end, a distance between the first end and the second end defining a length of each longeron and the length of the first unit cell, each longeron comprising a plurality of continuous, unidirectionally aligned fibers having a length substantially equal to the length of the first unit cell, and wherein the three longerons are arranged in a three-dimensional chevron shape, wherein the first longeron is located at an apex of the chevron shape, and wherein a thickness of the second longeron and the third longeron is about one-half of the thickness of the first longeron;
  (ii) a plurality of cross members, each cross member having a first end and second end, a distance between the first and second end of a respective cross member defining a length thereof, each cross member comprising a plurality of continuous, unidirectionally aligned fibers having a length substantially equal to the length of the respective cross member, wherein:
    (a) the first end of each cross member couples to the first longeron, and wherein, at the first end of the cross members, at least some of the fibers overlap at least some of the fibers in the first longeron,
    (b) the second end of each cross member couples to either the second or the third longeron, and wherein at the second end of the cross members, at least some of the fibers overlap at least some of the fibers in the respective second or third longeron to which the second end of each cross member is coupled;

forming, via compression molding, a second unit cell, the second unit cell having first, second, and third longerons arranged in the chevron shape, wherein:
  (i) the first longeron in the secnd unit cell is located at the apex of the chevron shape,
  (ii) a thickness of the first longeron in the second unit cell is equal to the thickness of the first longeron in the first unit cell, and
  (iii) a thickness of the second longeron and the third longeron in the second unit cell is about one-half of the thickness of the first longeron; and thermally bonding, along the length thereof, the second and third longeron of the first unit cell to the second and third longerons, respectively, of the second unit cell, wherein, during bonding, fiber engagement across an interface of the first unit cell and the second unit cell is established, wherein fibers from associated with the second and third longeron of at least one of the first or second unit cells intermingle with fibers associated with the second and third longerons of the other of the second or first unit cell, thereby forming a first truss structure having four longerons of about equal thickness and a quadrilateral shape.

3. the method of claim 2 wherein the second and third longerons of the first or second unit cell include fibers that sare shorter than the fibers that are aligned with a long axis of the longerons, wherein the shorter fibers do not align with the long axis of the longerons,
the method comprising intermingling, during thermal bonding, the shorter fibers from the second and third longerons of the first unit cell with the shorter fibers from the second and third longerons of the second unit cell.

4. The method of claim 2 wherein fiber engagement across the interface is established by a technique selected from the group consisting of creating foldable tabs in the second and/or third longerons, providing local flowable fibers in the second and/or third longerons, and providing consolidation rivets in the second and/or third longerons.

5. The method of claim 1 comprising:
providing a second truss structure having four longerons of substantially equal thickness and a quadrilateral shape that is substantially the same as the first truss structure;
thermally bonding a first end of each of the four longerons of the first truss structure to a first end of each of the four longerons of the second truss structure, thereby extending a length of the truss structure formed by the joinder of the first and second unit cells.

6. The method of claim 2 comprising:
providing a second truss structure having four longerons of substantially equal thickness and a quadrilateral shape that is substantially the same as the first truss structure;
thermally bonding a first end of each of the four longerons of the first truss structure to a first end of each of the four longerons of the second truss structure, thereby extending a length of the truss structure formed by the joinder of the first and second unit cells.

\* \* \* \* \*